United States Patent [19]
Lombardi

[11] Patent Number: 5,533,833
[45] Date of Patent: Jul. 9, 1996

[54] BULK BACKFILL IN SITU LINER FOR HARD ROCK ENVIRONMENT

[75] Inventor: John A. Lombardi, Boulder, Colo.

[73] Assignee: John Lombardi, Boulder, Colo.

[21] Appl. No.: 253,979

[22] Filed: Jun. 3, 1994

[51] Int. Cl.⁶ .................................................. B09B 1/00
[52] U.S. Cl. ........................... 405/128; 405/53; 405/270
[58] Field of Search .............................. 405/128, 129, 405/53, 55, 263–270

[56] References Cited

U.S. PATENT DOCUMENTS

| | | | |
|---|---|---|---|
| 2,333,287 | 11/1943 | Baird | 405/265 |
| 3,466,873 | 9/1969 | Present | 405/128 |
| 3,763,072 | 10/1973 | Krieger | 405/270 X |
| 4,352,601 | 10/1982 | Valiga et al. | 405/270 |
| 4,496,268 | 1/1985 | Ressi di Cervia | 405/267 X |
| 4,580,925 | 4/1986 | Matich | 405/53 X |
| 4,863,312 | 9/1989 | Cavalli | 405/267 X |
| 5,078,543 | 1/1992 | Terrez | 405/270 X |
| 5,132,021 | 7/1992 | Alexander | 405/128 X |
| 5,199,816 | 4/1993 | Paurat et al. | 405/55 X |
| 5,294,215 | 3/1994 | Millgard | 405/207 X |

FOREIGN PATENT DOCUMENTS 4019547  9/1994  WIPO ................................ 405/267

Primary Examiner—William P. Neuder
Assistant Examiner—Frederick L. Lagman
Attorney, Agent, or Firm—Greenlee, Winner and Sullivan

[57] ABSTRACT

In situ liners are impermeable compound backfilled underground rock channels which are artificially cut and laterally and vertically extensive. The backfilled channel cuts may be joined to form six-sided enclosures, five-sided basins, four-sided conduits, and three-sided (or less) diversion surfaces. The channel are backfilled by bulk materials (e.g. sand, untreated or pre-or post-placement treated), or the bulk material can be layered between spray-on liner materials on the channel hanging wall and floorwall. This in situ liner allows containment and control of solutions, liquids, gases, or solids, which may be permanently or temporarily stored, processed, or diverted.

6 Claims, 3 Drawing Sheets

# BULK BACKFILL IN SITU LINER FOR HARD ROCK ENVIRONMENT

BACKGROUND OF THE INVENTION

1. Field of the Invention

This invention relates to impermeable liner structures for use in containment and control of the underground movement of gases, liquids, solutions, and solids in the mining, waste disposal, environmental remediation, and renewable energy industries.

2. Description of Related Art

Two types of in situ lining have been proposed by others. In one type, plastic lined coal shearer longwall undercuts in residual soils have been proposed as underliner for near surface waste storage basins. This proposal involves placement of sheets of plastic on freshly broken underground rock surfaces, which involves difficulties of joining, placement and maintenance of the liner.

In a second type of in situ lining, a leachate impermeable sand backfill liner placed in a coal shearer longwall undercut in residual soils has been proposed as a leachate cut off or collection layer between landfills.

Both of these proposals involve only liner construction in residual soils or soft, sedimentary rocks and the liner is oriented only in the near horizontal condition.

Curtain grouting is another in situ liquid and gas control technique. In curtain grouting liner materials are injected into a rock mass and fill the rock mass fracture system. The injection of liner materials cannot be directly observed, and the integrity of the grout curtain must be inferred. In reality, the fracture filling is erratic and a well placed grout curtain may be capable only of about 90–95% liquid containment.

Naturally occurring or artificially injected interstitial water may be frozen with the formation of liners capable of barricading liquid flows from ingress into localized underground zones. Such liners are effective although expensive to install and maintain against melting.

None of the prior art in situ liners solve the need for permanent, inexpensive, effective liners in hard-rock environments.

SUMMARY OF THE INVENTION

Recent research in the area of mechanical excavation mining systems has identified drillhole-excavation techniques with significant potential for environment application. The drillhole-excavation of narrow, wall-like channels, and the excavation of near horizontal channels, are the key excavations required for the creation of impermeable, in situ lined underground volumes. In situ liner segments can be shaped and joined to create solution control structures to barricade, divert, channel, vat retain, and encapsulate contaminated ground waters. Rock zone encapsulations can also be excavated and backfilled with solid wastes, or backfilled to optimize the pore space for the storage of liquids or compressed gas.

Drillhole-excavation tools useful in cutting suitable channels include a plasma based cutter, a penetrating cone mechanical tool, and a radial-axial drill-split mechanical excavator. These tools are used to cut channels approximately two ft. wide (0.6 m) through hard rock. Such tools may be used to create channels in hard-rock which are vertical through horizontal in orientation.

In all applications the selection of channel backfill material suited to the fluid, solution, gas, and toxic leachate control function is a key technology.

The backfill material may be a single layer filling of the channels with an impermeable material. In a second embodiment, the backfill material is formed by multiple layers of different materials. In a multiple-layer backfill, the channel wall or walls may be sprayed with a sealant, a impermeable material is used to coat the sealant, and a permeable monitoring or collecting material is used to fill the channel. The permeable monitoring material may be monitored for the presence and movement of solutions.

Liners may be used to create a variety of underground structures. These include an encapsulated volume of 6 impermeable lined walls which form an interior space, the interior of which may or may not be excavated or backfilled or otherwise altered. A catchment structure of 5 impermeable lined walls may be used as a retention basin or cofferdam. An open ended flow channel may be formed of 4 impermeable lined walls and packed with backfill. Finally, a flow diverter may be formed of three or fewer impermeable lined walls and used as a aquifer shunt or meteoric flow umbrella.

The underground structures created by this invention may be used for the storage of solid wastes in sealed containments, the control of ground water flows, and the storage of liquids and gases in the pore spaces of backfilled containments.

These structures provide cost effective earth based storage of solid wastes, flammable liquids and chemicals, compressed gases, fresh water, and heat and cold. They also allow a wide variety of environmentally attractive civil improvements for communities such as stored heat and cold for district heating and cooling, the safe storage of solar generated hydrogen, methane and acetylene gases, vertical landfilling, arid lands greening, and agriculture and silviculture through the creation of shallow, artificial aquifers. Liners containing foam, such as sand-polyurethane foam, may be used to cut off seismic waves due to blasting.

Further specific applications include liner-encapsulated deep underground rock quarries which are backfilled with municipal solid waste and hermetically sealed. Similarly, toxic wastes or despoiled ground waters may be stored in in situ lined vats. In situ lined ion exchange columns and filter beds may be used for the treatment of despoiled ground waters. In situ caps, seals, and diversion and drainage structures may be used to preclude mixing of ground water systems of unlike qualities. Contaminated ground water cut-off structures may be used to prevent the connection to surface water resources through springs, drainage tunnels, etc. Void space maximized underground containments may be used for the storage of flammable explosive fuels and for the storage of compressed gases such as methane, hydrogen, and acetylene. Impermeable lined structures may be used for the creation of near surface, open topped water impoundments to nonevaporatively store agricultural water in arid, deep aquifer terrains. Such structures allow creation of artificial wetlands and root irrigation agriculture and silviculture systems.

The underground structures created by this invention may be used to encapsulate broken or unbroken ores precedent to the injection of oxidation and or leach and or wash-water solution, of gases, and of thermal commodities, to abet the extraction of values from the aforesaid enclosed ores. These ore treatments are called solution controlled stope leaching and solution controlled stope autoclaving systems. In autoclave systems ores are batch processed underground using low-temperature, low-pressure, long residence time chemistries, as opposed to surface autoclave ore treatment chemistries which require high temperatures and pressures and short residence times. Stope leach and stope autoclave mining can also be pursued in separate, orebody adjacent, underground structures. The invention is also expected to inspire the mining industry development of bio-lixiviants, i.e., aqueous bacteria laden solutions that effect the leaching of values from ores or oxidize the ore precedent to other, chemical, values stripping steps; in this event, in situ liners compatible with the bio-reagents will need to be used.

The objective of this invention is to provide impermeable walls for underground structures in hard-rock.

Another objective is to provide methods for constructing impermeable walls for underground structures in hard-rock.

Another objective is to provide an impermeable single layer backfilling liner for channels thus forming underground structure walls in hard-rock.

Another objective is to provide an impermeable multiple layer backfilling liner for channels thus forming underground structure walls in hard-rock.

Another objective is to provide underground structures which may be used to store solid wastes in sealed containments, control ground water flows, and storage of liquids and gases in the pore spaces of backfilled containments.

A final objective is to provide simple, inexpensive, environmentally benign impermeable walls for underground structures.

DESCRIPTION OF THE PREFERRED EMBODIMENT

Forming the Channels.

Narrow, preferably approximately two feet wide, excavations are cut into hard rock with vertical or horizontal orientation forming wall, roof, or floor-like channels. Suitable channel widths range from 6 inches to 4 feet. Such channels may be formed by drillhole-excavation.

At least three drillhole-excavation tool types have been identified as suitable for use in cutting the channels. 1. The "plasma blaster" plasma cutting tool, Noranda Minerals, Inc., was described in J. A. Lombardi, Mechanical Excavation Mining Systems. 2d International Symposium on Mine Mechanization and Automation, ed. G. Almgren, N. Kumer, N. Vagenas, Lulea, Sweden, June 7–10, Balkema, 1993, pp. 33–44. 2. The "Penetrating cone" excavator, was developed is by Sunburst Corp. and was described in C. Young, R. D. Dick, and W. L. Fourney, Small-Charge Cone-Fracture Technique for Rapid Excavation. Paper in Fragblast '90, Brisbane, Australia, Aug. 26–31, 1990, pp. 129–135. 3. The U.S. Bureau of Mines radial-axial drill-split mechanical excavator (drill-split tool) was described in J. J. Anderson, and D. E. Swanson, Laboratory Testing of a Radial-Axial Loading Splitting Tool. BuMines RI 8722, 1982, 26 pp.

A preferred process for cutting the channels uses the drill-split tool.

The drill-split tool consists of two separate parts: the drill, and the splitter. Both parts may be integrated in a single tool, which drills a hole, indexes the splitter to the drilled hole, splits, then rotates back to the drill. In this process, a radial-axial pressure is applied to the base of a drilled borehole and a cone of rock is spalled from the face of the rock. The volume of rock spalled from a drillhole at a free face is roughly proportional to the hole depth cubed.

$$V = \frac{1}{3}\pi(3.5)^2 D^3$$

V is volume. D is depth of the hole. Local fracture patterns and extreme confinement, such as mining of a blind heading, reduce the volume of rock dislodged from that in the equation.

The drill-split tool may be operated using remotely operated drillhole-excavation tools mounted on a stope wall-walking jumbo or other cutting systems for narrow vein mining and wall construction. Although the channel cutting has been described using drillhole-excavation, other methods may be used to cut the narrow channels used in this invention.

Lining the Channels.

Figure 1:
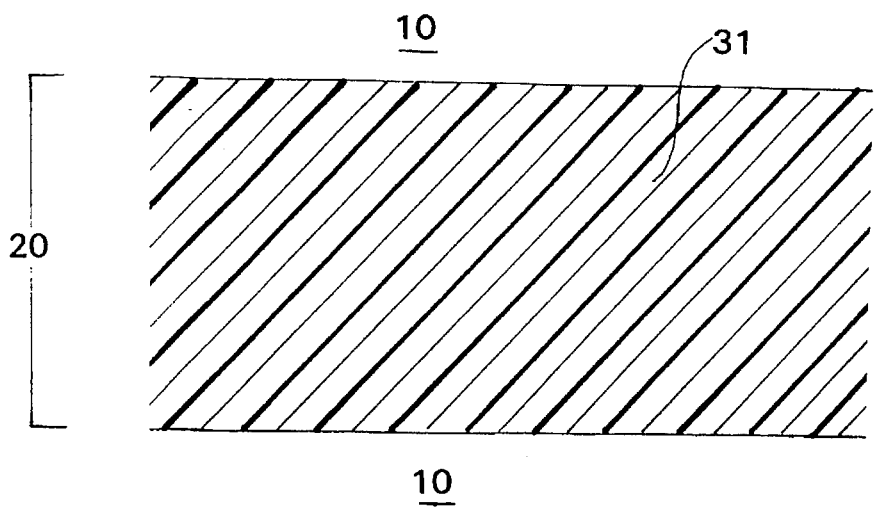
FIG. 1 is a diagrammatic depiction of a cross section of a liner with a single-layer backfill.

Single-Layer Backfill. A single-layer backfill consists of a liquid and gas impermeable material used to fill the channels. FIG. 1 is a cross-section of a channel with a single-layer backfill. A channel 20 is cut in the hard-rock mass 10. The channel is filled with sand-sodium silicate compound backfill 31. A sand-sodium silicate compound is suitable as single-layer backfill. Sand backfills in either vertical or horizontal channels may be redrilled and inundated with water activated polyurethane foam compounds. These sand-polyurethane foam backfills are cellular and water impermeable. Ground movements do not create fill traversing cracks when sand-polyurethane foam backfill is used. Hot mix asphalt-sand mixtures also may be used as single-layer backfill. Sand-flue-gas-desulferization cement is also a suitable single-layer backfill.

Autogenously healing substances flow and refill cracks which appear due to ground settlement. Crack self-healing preserves liner integrity. The above single-layer backfill materials exhibit autogenous healing.

Figure 2:
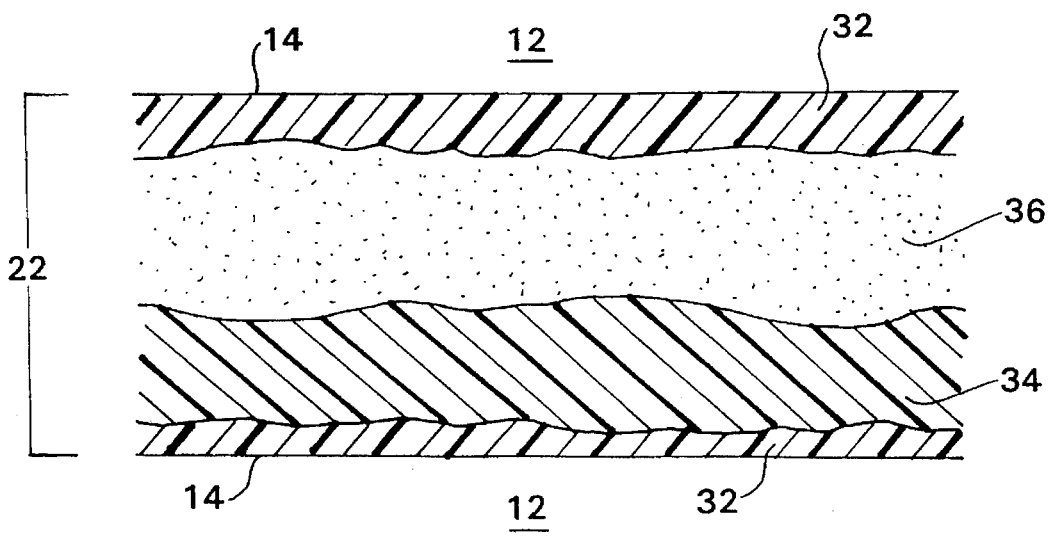
FIG. 2 is a diagrammatic depiction of a cross section of a liner with a multiple-layer backfill.

Multiple-Layer Backfill. A multiple-layer backfill consists of several layers of materials, of which at least one layer is impermeable. A typical multiple-layer backfill comprises an impermeable material coating or sealant on one or both channel walls, an impermeable material coating the sealant, and a permeable material filling the remaining void of the channel. FIG. 2 is a cross section of a channel with a multiple-layer backfill liner. A channel 22 is cut in hard-rock mass 12. In this embodiment, both channel walls 14 are sprayed with impermeable bitumen sealant 32. The sealant on one wall is coated with impermeable sand-polyurethane foam 34. The remaining void of the channel is filled with permeable sand 36. The permeable layer is drained by monitoring or collecting drains and is used to channel and monitor the movement of fluids through the liner. The permeable layer can be used for in situ liner leak detection and collection of leaked fluids, for geohydrologic flow interception and diversion, and for stored fluid, solution, or gas interception and drainage.

Other multiple-layer backfills may be used. The materials used in the single-layer backfill may be used with multiple-layer backfills. In both single and multiple-layer backfills, the chemical and physical compositions of backfill materials and the engineered layering of materials is dictated by the nature of the chemical compositions, pressures, temperatures, viscosities, and flow rates of the substances interfacing with the in situ liner and the designed storage or processing function of the in situ liner construct.

The liners described above are adequate for the control of various materials such as fresh water, organo-chemical contaminated waters, brines, most gases, acid and base chemicals, gaseous or liquid energy fuels, trash and trash leachates, and dry chemical solids, at temperatures from below ambient to 200° C. and pressures to 200 psi.

Underground Structures.

The drillhole-excavation narrow-vein mining system proposed for use in the construction of wall-like in situ liner segments is limited to dips greater than 55°. This limitation is based on the need for the excavated rock to flow by gravity to the bottom of the excavation, to the mucking drift level. The drillhole-excavation longwall technique proposed for the creation of roof-and floor-like in situ liner segments is limited to less than 15% grades and 30° shield line slopes (dip), where dip is defined as the angle measured between the horizontal and the axis of the channel cut in the hard rock. Within these limits, channel topcuts, bottomcuts, and wall-like sidecuts can be connected in any fashion to form top and bottom fully closed six-sides, zonal isolations or isolation cells; bottom closed, top surface exposed, five-sided vats, catchments, or retention basins or cofferdams; bottom and top open four sided flow channels or funnels; and three or fewer sided ground water diversion surfaces or flow diverters. Of course, adequate provision for support must be made when bottomcuts are made.

FIGS. 3–6 show some examples of underground structures which may be formed by the impermeable linings of this invention.

Figure 3:
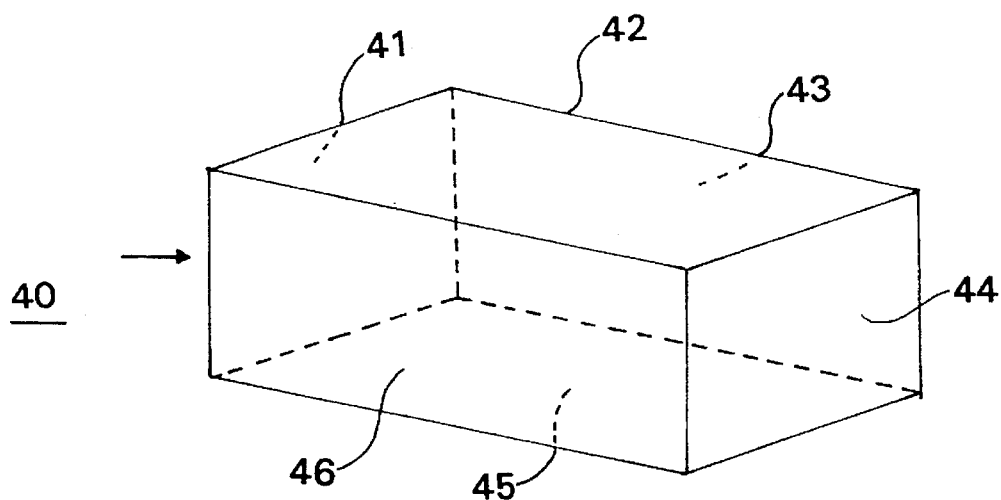
FIG. 3 is a diagrammatic depiction of an underground isolation cell.

FIG. 3 depicts an isolation cell 40 containing an encapsulated volume and constructed of 6 impermeable walls, 41, 42, 43, 44, 45, and 46. The interior of the isolation cell may be excavated if care is taken to leave rock material for the formation of two sided channels around the periphery of the cell. An evacuated cell may be filled with a wide variety of materials including municipal solid wastes, flammable liquids and chemicals, compressed gases, fresh water, toxic wastes, acidic and basic chemicals, and may be held at temperatures from below ambient to 200° C., and pressures from atmospheric to 200 psi. The isolation call may be excavated and filled with porous mineral material for storage of liquids and gases.

Figure 4:
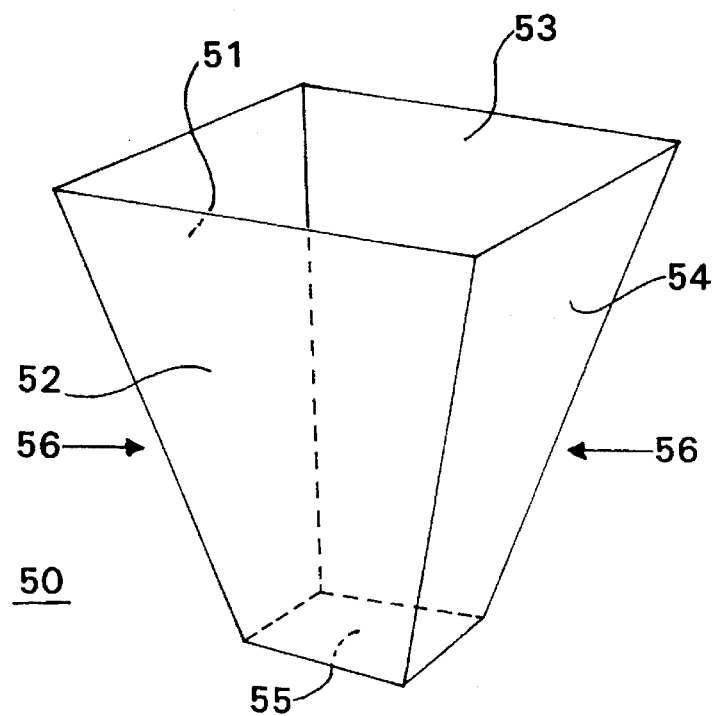
FIG. 4 is a diagrammatic depiction of an underground catchment basin.

FIG. 4 depicts a catchment basin, retention basin, or cofferdam 50 constructed of four impermeable walls 51, 52, 53, and 54 and an impermeable floor 55. The level of the natural water table is indicated by arrows 56. A catchment basin may be used to provide near surface, open-topped water impoundments to nonevaporatively store agricultural water in arid, deep aquifer terrains. Such impoundments aid in creation of artificial wetlands and root irrigation agriculture and silviculture systems.

Figure 5:
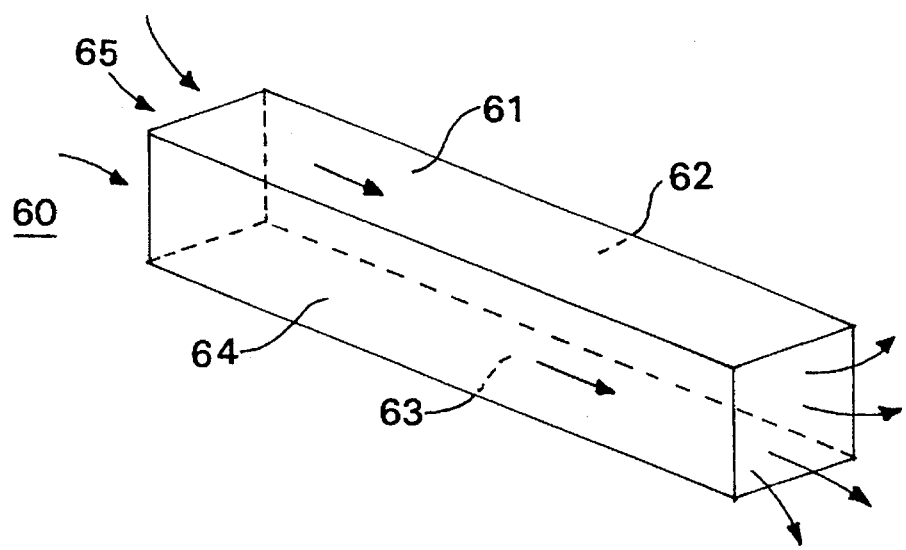
FIG. 5 is a diagrammatic depiction of an underground open ended flow channel.

FIG. 5 depicts an open ended flow channel 60 constructed of four impermeable walls 61, 62, 63, and 64. An underground flow of fluid or gas may be directed through the channel and is indicated by arrows 65. In addition, the flow channel may be filled with packed bed ion-exchange media or materials for treatment of flows directed through the channel.

Figure 6:
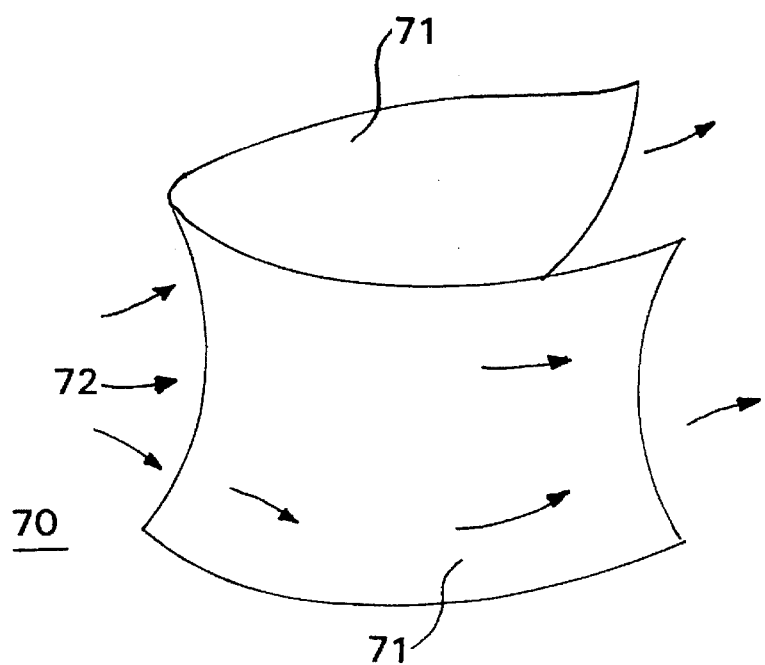
FIG. 6 is a diagrammatic depiction of an underground flow diverter.

FIG. 6 depicts a flow diverter constructed of a single curved wall 71. A flow diverter may be constructed of three or fewer walls and is used as an aquifer shunt or meteoric flow umbrella. The diverter may be used to prevent the connection of contaminated ground water with surface water resources through springs, drainage tunnels, etc.

It will be apparent to those skilled in the art that the examples and embodiments described herein are by way of illustration and not of limitation, and that other examples may be utilized without departing from the spirit and scope of the present invention, as set forth in the appended claims.

I claim:

1. An impermeable in situ liner in combination with an underground hard rock structure for use in solution controlled stope leaching and solution controlled autoclaving of ores in the hard rock, said combination comprising:

a hard rock wall structure including substantially vertical and substantially horizontal channels of 6 inches to 4 feet in width cut into the hard rock, so as to completely surround a volume of hard rock containing the ores, said vertical channels having a dip greater than 55°, and said horizontal channels having a dip less than 30°, and an impermeable backfill comprising sand-sodium silicate filling said channels to form a completely enclosed in situ liner.

2. The process of constructing an impermeable in situ liner for enclosing an underground structure in hard rock for use in solution controlled stope leaching and solution controlled autoclaving of ores in the hard rock, said process comprising:

cutting substantially vertical and substantially horizontal channels 6 inches to 4 feet in width in hard rock so as to completely surround a volume of hard rock containing the ores, said vertical channels having a dip greater than 55°, and said horizontal channels having a dip less than 30°, and filling said channels with an impermeable backfill comprising sand-sodium silicate so as to form a completely enclosed in situ liner.

3. The liner of claim 2 wherein the underground structure comprises one of an isolation cell, a catchment basin, an open ended flow channel, and a flow diverter.

4. The process of claim 2 wherein the channels are cut using a drillhole-excavation step.

5. The process of claim 4 wherein the drillhole-excavation step comprises one of plasma blasting, penetrating coning, and drilling-split spalling.

6. The process of claim 4 wherein the drillhole-excavation step comprises drill-split spalling.

* * * * *